(12) United States Patent
Dong

(10) Patent No.: US 10,656,381 B2
(45) Date of Patent: May 19, 2020

(54) DUAL-LENS MODULE DRIVING DEVICE

(71) Applicant: AAC Technologies Pte. Ltd., Singapore (SG)

(72) Inventor: Leping Dong, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 173 days.

(21) Appl. No.: 16/102,076

(22) Filed: Aug. 13, 2018

(65) Prior Publication Data
US 2019/0162934 A1    May 30, 2019

(30) Foreign Application Priority Data
Nov. 29, 2017   (CN) .......................... 2017 1 1221755

(51) Int. Cl.
| | |
|---|---|
| *G02B 13/00* | (2006.01) |
| *G02B 7/10* | (2006.01) |
| *G02B 7/09* | (2006.01) |
| *H04N 5/232* | (2006.01) |
| *H04N 5/225* | (2006.01) |
| *G02B 13/06* | (2006.01) |

(52) U.S. Cl.
CPC ............. *G02B 13/003* (2013.01); *G02B 7/09* (2013.01); *G02B 7/102* (2013.01); *G02B 13/06* (2013.01); *H04N 5/2254* (2013.01); *H04N 5/2258* (2013.01); *H04N 5/23267* (2013.01)

(58) Field of Classification Search
USPC .......................................................... 396/326
See application file for complete search history.

(56) References Cited

U.S. PATENT DOCUMENTS

| | | | | |
|---|---|---|---|---|
| 3,558,211 A | * | 1/1971 | Westell ................ | G02B 27/646 359/555 |
| 4,124,798 A | * | 11/1978 | Thompson ............. | G02B 23/12 250/214 VT |
| 5,995,762 A | * | 11/1999 | Enomoto ............... | G02B 7/023 348/E5.046 |

(Continued)

*Primary Examiner* — Clayton E. LaBalle
*Assistant Examiner* — Warren K Fenwick
(74) *Attorney, Agent, or Firm* — IPro, PLLC; Na Xu

(57) ABSTRACT

The present disclosure provides a dual-lens module driving device, which comprises a shell, wherein the shell comprises a top wall and a side wall, the top wall is provided with a first opening and a second opening, a base and a support frame, the support frame is provided with a first accommodating cavity and a second accommodating cavity, a first lens tube, a second lens tube, a first lens set, a second lens set, a first focusing coil set, a second focusing coil set, a first magnetic steel set, a second magnetic steel set, a circuit board, an optical anti-shaking coil set, a first elastic sheet set, a second elastic sheet set, a translational suspension system and a connecting terminal. Compared with the related arts, the dual-lens module driving device of the present disclosure is provided with two lens sets, so that the shooting range is increased; the two lens tubes share one support frame, so that the structure is compact; the two focusing coil sets are provided to improve the shooting accuracy; and the dual-lens module driving device is also provided with the optical anti-shaking coil set, which can effectively compensate for a dither amplitude position and improve the shooting effect and sharpness.

9 Claims, 4 Drawing Sheets

(56) References Cited

U.S. PATENT DOCUMENTS

| | | | |
|---|---|---|---|
| 7,961,234 B2* | 6/2011 | Viinikanoja | H04N 13/239 |
| | | | 348/264 |
| 8,660,420 B2* | 2/2014 | Chang | G03B 35/08 |
| | | | 396/326 |
| 8,817,375 B2* | 8/2014 | Motoike | G03B 5/00 |
| | | | 359/554 |
| 9,001,224 B2* | 4/2015 | Moriya | G03B 3/10 |
| | | | 348/208.99 |
| 9,392,188 B2* | 7/2016 | Shabtay | G02B 13/02 |
| 9,413,972 B2* | 8/2016 | Shabtay | G02B 27/646 |
| 9,571,731 B2* | 2/2017 | Shabtay | H04N 5/23212 |
| 2018/0224625 A1* | 8/2018 | Tseng | G02B 27/017 |

* cited by examiner

DUAL-LENS MODULE DRIVING DEVICE

CROSS-REFERENCE TO RELATED APPLICATIONS

This application claims the priority benefit of Chinese Patent Applications Ser. No. 201711221755.4 filed on Nov. 29, 2017, the entire content of which is incorporated herein by reference.

FIELD OF THE PRESENT DISCLOSURE

The present disclosure relates to an acoustoelectric field, and more particularly, to a dual-lens module driving device applied to a portable electronic product.

DESCRIPTION OF RELATED ART

With the development of smart phones, people have increasingly higher requirements on the smart phones, especially on photographing functions of the smart phones.

A single camera cannot take wide angle and long-focus angle into consideration in the meanwhile due to a fixed focal length, a default wide-angle lens is suitable for shooting some macroscopic landscapes, but when a shot subject is far away and cannot be approached, imaging will be significantly limited. In addition, when shooting a figure feature, it is impossible to make a bokeh shooting effect similar to a professional camera to emphasize the subject since there is no information regarding a depth of field. In order to improve the shooting effect, shooting range and sharpness of the mobile phone, and improve the functionality and application scenario of a portable handheld shooting device, the dual-lens module driving device of a dual-camera technology is studied and applied.

Two single cameras are used in the dual-lens module driving device with a dual-camera structure in the related arts. However, two single auto-focusing devices are respectively used in a module phase of the dual-lens module driving device, and the two single auto-focusing devices act respectively, so that the shooting accuracy of the dual cameras cannot be ensured. Moreover, the anti-shaking function of the two single cameras also needs to be improved.

Therefore, it is necessary to provide a new dual-lens module driving device to solve the technical problems above.

SUMMARY

The present disclosure aims at providing a dual-lens module driving device with simple structure and high accuracy.

In order to achieve the objects above, the present disclosure provides a dual-lens module driving device, which comprises: a shell comprising a top wall and a side wall extending from the top wall, wherein the top wall is provided with a first opening and a second opening in parallel; a base forming an accommodating space matched with the shell; a support frame accommodated in the accommodating space and comprising a first accommodating cavity arranged corresponding to the first opening and a second accommodating cavity arranged corresponding to the second opening; a first lens tube and a second lens tube respectively accommodated in the first accommodating cavity and the second accommodating cavity; a first lens set and a second lens set respectively matched in the first lens tube and the second lens tube; a first focusing coil set annularly arranged on an outside surface of the first lens tube for driving the first lens tube AF focus or adjust the change of an optical axis during the AF focus; a second focusing coil set annularly arranged on an outside surface of the second lens tube for driving the second lens tube AF focus or adjust the change of an optical axis during AF focus; a first magnetic steel set fixed in the support frame and arranged opposite to the first focusing coil set with spacing; a second magnetic steel set fixed in the support frame and arranged opposite to the second focusing coil set with spacing; a circuit board arranged below the first magnetic steel set and the second magnetic steel set, and fixed in the base; an optical anti-shaking coil set arranged below the first magnetic steel set and the second magnetic steel set, and fixed in the circuit board for driving the support frame to move in a horizontal direction; a first elastic sheet set with one end fixed in the support frame, and the other end fixed in the first lens tube; a second elastic sheet set with one end fixed in the support frame, and the other end fixed in the second lens tube; and a translational suspension system composed of a plurality of suspension wires, wherein the plurality of suspension wires are respectively arranged at circumferential sides of the support frame for supporting the first focusing coil set or the second focusing coil set to make small displacement in any direction in a vertical optical axis plane, and the suspension wires are fixed in the base.

Preferably, the first focusing coil set is provided with four first focusing coils annularly arranged in the outside surface of the first lens tube evenly, the first magnetic steel set is provided with four first driving magnetic steels, and the four first driving magnetic steels are arranged in one-to-one correspondence with the four first focusing coils.

Preferably, the second focusing coil set is provided with four second focusing coils annularly arranged in the outside surface of the second lens tube evenly, the second magnetic steel set is provided with four second driving magnetic steels, and the four second driving magnetic steels are arranged in one-to-one correspondence with the four second focusing coils.

Preferably, the optical anti-shaking coil set comprises four first optical anti-shaking coil sets and four second optical anti-shaking coil sets interlaced with the four first optical anti-shaking coil sets.

Preferably, the four first optical anti-shaking coil sets are arranged in series or in parallel with each other.

Preferably, the four second optical anti-shaking coil sets are arranged in series or in parallel with each other.

Preferably, the first elastic sheet set comprises a first upper elastic sheet close to the top wall and a first lower elastic sheet close to the base; and the second elastic sheet set comprises a second upper elastic sheet close to the top wall and a second lower elastic sheet close to the base.

Preferably, the plurality of suspension wires are fixed in the base, and are arranged at the circumferential sides of the support frame corresponding to the first accommodating cavity and the second accommodating cavity.

Preferably, the dual-lens module driving device further comprises a plurality of connecting terminals arranged in the base for realizing electric connection between the circuit board and the outside.

Compared with the related arts, the dual-lens module driving device of the present disclosure is provided with the first lens set and the second lens set, so that the shooting range is increased; the first accommodating cavity and the second accommodating cavity are arranged in parallel in the support frame for accommodating the first lens tube and the second lens tube, and the first lens tube and the second lens tube share the support frame, so that the structure is compact, and the overall length of the dual-lens module driving device is reduced; the dual-lens module driving device is provided with the first focusing coil set and the second focusing coil set, which drive the two lens tubes AF focus or adjust the change of the optical axis during AF focus, so as to improve the shooting accuracy; the dual-lens module driving device is further provided with the optical anti-shaking coil set comprising the first optical anti-shaking coil set and the second optical anti-shaking coil set, the first optical anti-shaking coil sets are arranged in series or in parallel with each other, and the second optical anti-shaking coil sets are arranged in series or in parallel with each other, so that the first accommodating cavity and the second accommodating cavity can move in the horizontal direction at the same time, so as to conduct position compensation for the movement of the two lens tubes driven by the movement of the support frame or the image shift caused by the shaking of an imaging system. The anti-shaking compensation to the deflection of the optical axis and the anti-shake compensation to the translation of the optical axis work together to maximumly compensate for the dither amplitude position effectively, so as to improve the shooting effect and sharpness.

BRIEF DESCRIPTION OF THE DRAWINGS

In order to illustrate the technical solutions in the embodiments of the disclosure more clearly, the drawings used in the description of the embodiments will be briefly described hereinafter. Obviously, the drawings in the following description are merely some embodiments of the disclosure, and those skilled in the art can also obtain other drawings according to these drawings without going through any creative work, wherein.

DETAILED DESCRIPTION OF THE EXEMPLARY EMBODIMENTS

The technical solutions in the embodiments of the disclosure will be clearly and perfectly described hereinafter with reference to the drawings in the embodiments of the disclosure, and obviously, the described embodiments are merely some but not all the embodiments of the disclosure. Based on the embodiments in the present disclosure, all other embodiments obtained by those skilled in the art without going through any creative work shall fall within the protection scope of the disclosure.

Figure 1:
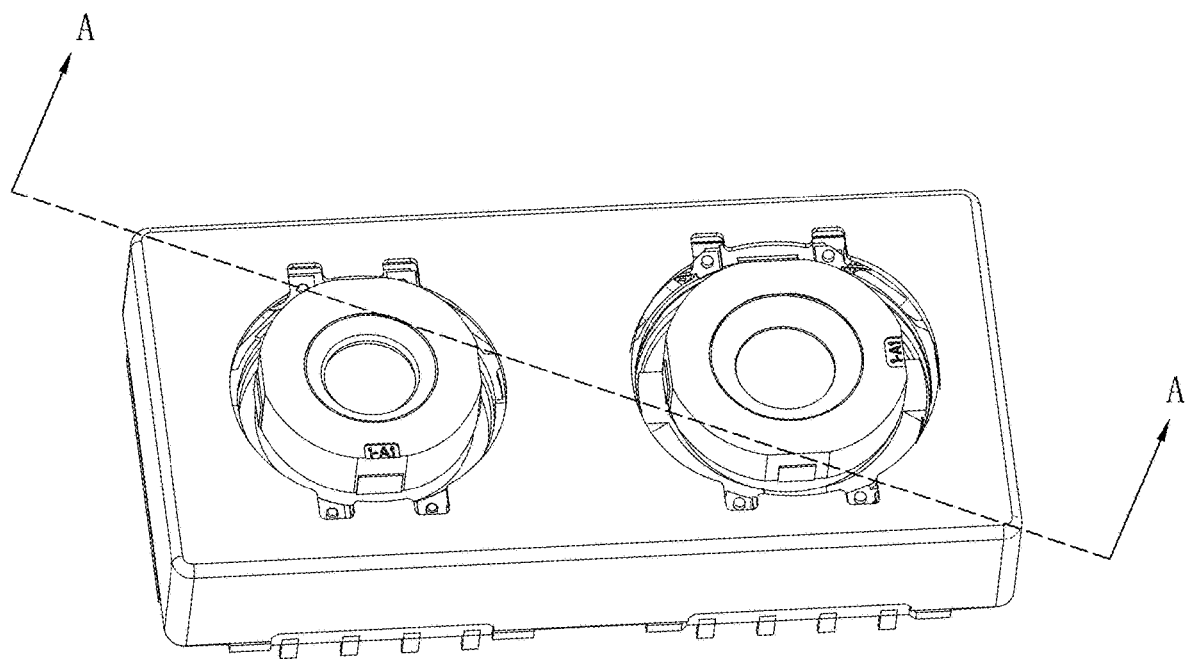
FIG. 1 is a perspective view of a dual-lens module driving device according to the present disclosure.
Figure 2:
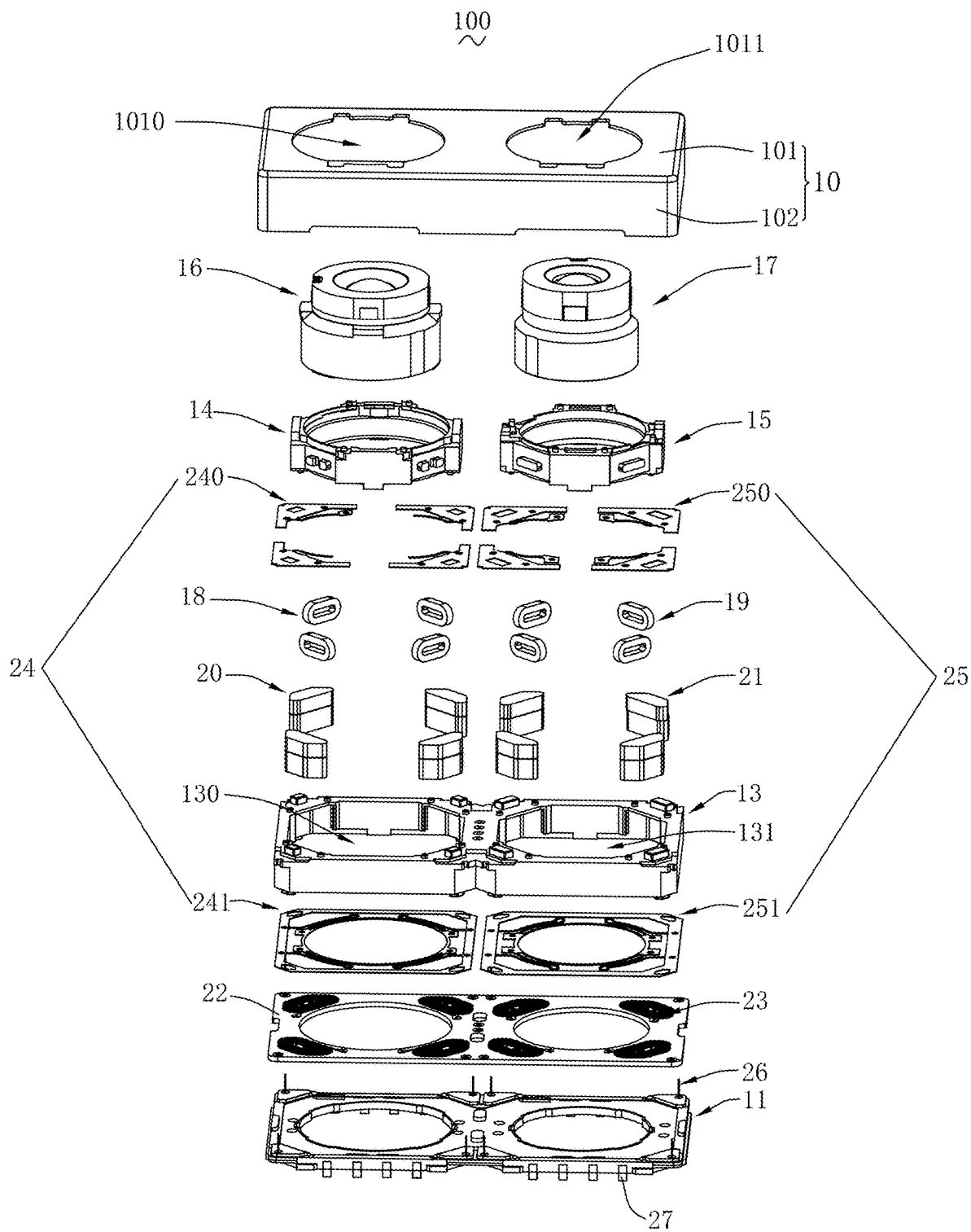
FIG. 2 is an exploded view illustrating a stereostructure of the dual-lens module driving device according to the present disclosure.
Figure 3:
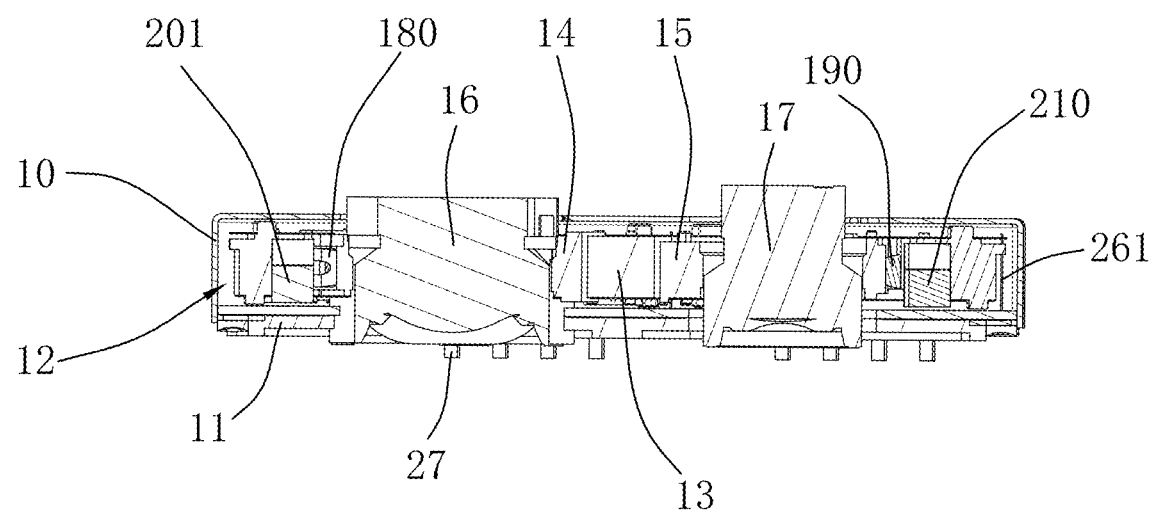
FIG. 3 is a cross-sectional view along an A-A line in FIG. 1.

Please refer to FIGS. 1 to 3 at the same time. FIG. 1 is a perspective view of a dual-lens module driving device according to the present disclosure. FIG. 2 is an exploded view illustrating a stereostructure of the dual-lens module driving device according to the present disclosure. FIG. 3 is a cross-sectional view along a A-A line in FIG. 1. The present disclosure provides a dual-lens module driving device 100, which comprises a shell 10, a base 11, an accommodating space 12, a support frame 13, a first lens tube 14, a second lens tube 15, a first lens set 16, a second lens set 17, a first focusing coil set 18, a second focusing coil set 19, a first magnetic steel set 20, a second magnetic steel set 21, a circuit board 22, an optical anti-shaking coil set 23, a first elastic sheet set 24, a second elastic sheet set 25, a translational suspension system 26 and a connecting terminal 27.

The shell 10 comprises a top wall 101 and a side wall 102 extending from the top wall 101 to four sides, and the top wall 101 is provided with a first opening 1010 and a second opening 1011 in parallel along a long side direction thereof.

The base 11 forms the accommodating space 12 matched with the shell 10.

The support frame 13 is accommodated in the accommodating space 12 and comprises a first accommodating cavity 130 arranged corresponding to the first opening 1010 and a second accommodating cavity 131 arranged corresponding to the second opening 1011.

The first lens tube 14 is arranged in the first accommodating cavity 130, the second lens tube 15 is arranged in the second accommodating cavity 131, and the first lens tube 14 and the second lens tube 15 can respectively move along an optical axis direction in the first accommodating cavity 130 and the second accommodating cavity 131.

The first lens set 16 is matched in the first lens tube 14, the second lens set 17 is matched in the second lens tube 15, and the two lens sets are used to acquire images when shooting an object.

The first lens tube 14 and the second lens tube 15 share the support frame 13, so that the structure is compact, which reduces the overall length of the dual-lens module driving device 100 and makes full use of the available space.

The first focusing coil set 18 is provided with four first focusing coils 180, the first focusing coil set 18 may also be provided with eight first focusing coils 180, which are annularly arranged in the outside surface of the first lens tube 14 evenly for driving the first lens tube 14 AF focus or adjust the change of an optical axis during AF focus.

The number of the second focusing coils 190 of the second focusing coil set 19 is the same as the number of the first focusing coils 180 of the first focusing coil set 18, four second focusing coils 190 are provided, and eight second focusing coils 190 may also be provided, which are annularly arranged in the outside surface of the second lens tube 15 evenly for driving the second lens tube 15 AF focus or adjust the change of the optical axis during AF focus.

The number of the first magnetic steels 201 of the first magnetic steel set 20 is the same as the number of the first focusing coils 180 of the first focusing coil set 18, four first magnetic steels 201 are provided, and eight first magnetic steels 201 may also be provided, which are fixed in the support frame 13. The first magnetic steels 201 of the first magnetic steel set 20 is arranged in one-to-one correspondence with the first focusing coils 180 of the first focusing coil set 18. The first focusing coil 180 and the first magnetic steel 201 are correspondingly cooperated to generate a driving force along an optical axis direction to drive the first lens tube 14 to move along the optical axis direction.

The number of the second magnetic steels 210 of the second magnetic steel set 21 is the same as the number of the second focusing coils 190 of the second focusing coil set 19, four second magnetic steels 210 are provided, and eight second magnetic steels 210 can also be provided, which are fixed in the support frame 13. The second magnetic steels 210 of the second magnetic steel set 21 is arranged in one-to-one correspondence with the second focusing coils 190 of the second focusing coil set 19. The second focusing coil 190 and the second magnetic steel 210 are correspondingly cooperated to generate a driving force along the optical axis direction to drive the second lens tube 15 to move along the optical axis direction.

It should be noted that it is feasible to exchange the positions of the first focusing coil set 18 and the first magnetic steel set 20; and it is also feasible to exchange the positions of the second focusing coil set 19 and the second magnetic steel set 21, which will be easily conceived by those skilled in the art, and the principles thereof are the same and should all belong to the protection scope of the present disclosure.

The circuit board 22 is arranged below the first magnetic steel set 20 and the second magnetic steel set 21, and is fixed in the base 11 for electrical connection with the dual-lens module driving device 100.

Figure 4:
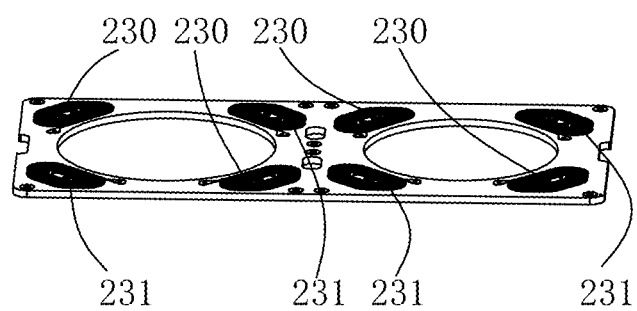
FIG. 4 is a perspective view of an optical anti-shaking coil set and a circuit board.

Please refer to FIG. 2 and FIG. 4, wherein FIG. 4 is a perspective view of an optical anti-shaking coil set 23 and a circuit board 22. The optical anti-shaking coil set 23 is arranged below the first magnetic steel set 20 and the second magnetic steel set 21, and is fixed in the circuit board 22. The optical anti-shaking coil set 23 comprises four first optical anti-shaking coil sets 230 and four second optical anti-shaking coil sets 231 interlaced with the four first optical anti-shaking coil sets 230, the four first optical anti-shaking coil sets 230 are arranged in series or in parallel with each other, the four second optical anti-shaking coil sets 231 are arranged in series or in parallel with each other, so that the first optical anti-shaking coil set 230 and the second optical anti-shaking coil set 231 simultaneously generate a magnetic power for driving the support frame 13 to move in a horizontal direction, and under the action of two sets of magnetic powers, the first accommodating cavity 130 and the second accommodating cavity 131 move in the same direction by the same amplitude, so as to conduct position compensation for the position to the movement of the first lens tube 14 and the second lens tube 15 driven by the movement of the support frame or the image shift caused by the shaking of an imaging system, thereby improving the shooting effect and sharpness.

The first elastic sheet set 24 has one end fixed in the support frame 13 and the other end fixed in the first lens tube 14, and comprises a first upper elastic sheet 240 close to the end of the shell 10 and a first lower elastic sheet 241 close to the base 11 for providing an elastic force and a restoring force to the movement of the first lens tube 14 in the optical axis direction.

The second elastic sheet set 25 has one end fixed in the support frame 13 and the other end fixed in the second lens tube 15, and comprises a second upper elastic sheet 250 close to the end of the shell 10 and a second lower elastic sheet 251 close to the base 11 for providing an elastic force and a restoring force to the movement of the second lens tube 15 in the optical axis direction.

The translational suspension system 26 is composed of a plurality of suspension wires 261, the plurality of suspension wires 261 are fixed in the base 11, and the plurality of suspension wires 261 are arranged at the circumferential sides of the support frame 13 corresponding to the first accommodating cavity 130 and the second accommodating cavity 131 for supporting the first focusing coil set 18 or the second focusing coil set 19 to make small displacement in any direction in a vertical optical axis plane.

The connecting terminal 27 is arranged in the base 11 for realizing electric connection between the circuit board 22 and the outside.

Compared with the related arts, the dual-lens module driving device 100 of the present disclosure is provided with the first lens set 16 and the second lens set 17, so that the shooting range is increased; the first accommodating cavity 130 and the second accommodating cavity 131 are arranged in parallel in the support frame 13 for accommodating the first lens tube 14 and the second lens tube 15, and the first lens tube 14 and the second lens tube 15 share the support frame 13, so that the structure is compact, which reduces the overall length of the dual-lens module driving device 100; the dual-lens module driving device 100 is provided with the first focusing coil set 18 and the second focusing coil set 19, which drive the first lens tube 14 and the second lens tube 15 AF focus or adjust the change of the optical axis during AF focus, so as to improve the shooting accuracy; The dual-lens module driving device 100 is further provided with the optical anti-shaking coil set 23 comprising the first optical anti-shaking coil set 230 and the second optical anti-shaking coil set 231, the first optical anti-shaking coil sets 230 are arranged in series or in parallel with each other, and the second optical anti-shaking coil sets 231 are arranged in series or in parallel with each other, so that the first accommodating cavity 130 and the second accommodating cavity 131 can move in the horizontal direction at the same time, so as to conduct position compensation for the movement of the two lens tubes driven by the movement of the support frame or the image shift caused by the shaking of an imaging system. The anti-shaking compensation to the deflection of the optical axis and the anti-shake compensation to the translation of the optical axis work together to maximumly compensate for the dither amplitude position effectively, so as to improve the shooting effect and sharpness.

Those described above are merely embodiments of the disclosure, and it should be noted that those skilled in the art can further make improvements without departing from the concept of the disclosure, and all these improvements shall fall within the protection scope of the disclosure.

What is claimed is:

1. A dual-lens module driving device, characterized in comprising:
    a shell comprising a top wall and a side wall extending from the top wall, wherein the top wall is provided with a first opening and a second opening in parallel;
    a base forming an accommodating space matched with the shell;
    a support frame accommodated in the accommodating space and comprising a first accommodating cavity arranged corresponding to the first opening and a second accommodating cavity arranged corresponding to the second opening;
    a first lens tube and a second lens tube respectively accommodated in the first accommodating cavity and the second accommodating cavity;
    a first lens set and a second lens set respectively matched in the first lens tube and the second lens tube;
    a first focusing coil set annularly arranged on an outside surface of the first lens tube for driving the first lens tube AF focus or adjust the change of an optical axis during AF focus;
    a second focusing coil set annularly arranged on an outside surface of the second lens tube for driving the second lens tube AF focus or adjust the change of an optical axis during AF focus;
    a first magnetic steel set fixed in the support frame and arranged opposite to the first focusing coil set with spacing;

a second magnetic steel set fixed in the support frame and arranged opposite to the second focusing coil set with spacing;

a circuit board arranged below the first magnetic steel set and the second magnetic steel set, and fixed in the base;

an optical anti-shaking coil set arranged below the first magnetic steel set and the second magnetic steel set, and fixed in the circuit board for driving the support frame to move in a horizontal direction;

a first elastic sheet set with one end fixed in the support frame, and the other end fixed in the first lens tube;

a second elastic sheet set with one end fixed in the support frame, and the other end fixed in the second lens tube; and a translational suspension system composed of a plurality of suspension wires, wherein the plurality of suspension wires are respectively arranged at circumferential sides of the support frame for supporting the first focusing coil set or the second focusing coil set to make small displacement in any direction in a vertical optical axis plane, and the suspension wires are fixed in the base.

2. The dual-lens module driving device according to claim 1, characterized in that the first focusing coil set is provided with four first focusing coils annularly arranged in the outside surface of the first lens tube evenly, the first magnetic steel set is provided with four first driving magnetic steels, and the four first driving magnetic steels are arranged in one-to-one correspondence with the four first focusing coils.

3. The dual-lens module driving device according to claim 2, characterized in that the second focusing coil set is provided with four second focusing coils annularly arranged in the outside surface of the second lens tube evenly, the second magnetic steel set is provided with four second driving magnetic steels, and the four second driving magnetic steels are arranged in one-to-one correspondence with the four second focusing coils.

4. The dual-lens module driving device according to claim 1, characterized in that the optical anti-shaking coil set comprises four first optical anti-shaking coil sets and four second optical anti-shaking coil sets interlaced with the four first optical anti-shaking coil sets.

5. The dual-lens module driving device according to claim 4, characterized in that the four first optical anti-shaking coil sets are arranged in series or in parallel with each other.

6. The dual-lens module driving device according to claim 5, characterized in that the four second optical anti-shaking coil sets are arranged in series or in parallel with each other.

7. The dual-lens module driving device according to claim 1, characterized in that the first elastic sheet set comprises a first upper elastic sheet close to the top wall and a first lower elastic sheet close to the base; and the second elastic sheet set comprises a second upper elastic sheet close to the top wall and a second lower elastic sheet close to the base.

8. The dual-lens module driving device according to claim 1, characterized in that the plurality of suspension wires are fixed in the base, and are arranged at the circumferential sides of the support frame corresponding to the first accommodating cavity and the second accommodating cavity.

9. The dual-lens module driving device according to claim 1, characterized in further comprising a plurality of connecting terminals arranged in the base for realizing electric connection between the circuit board and the outside.

\* \* \* \* \*